(12) United States Patent
Masuda et al.

(10) Patent No.: US 9,800,660 B2
(45) Date of Patent: Oct. 24, 2017

(54) COMMUNICATION DEVICE, COMMUNICATION SYSTEM AND COMMUNICATION METHOD

(71) Applicant: Panasonic Intellectual Property Management Co. Ltd., Osaka (JP)

(72) Inventors: Yoichi Masuda, Tokyo (JP); Masaki Ikeda, Toyama (JP); Tomoya Watanabe, Ishikawa (JP); Keiji Sakaguchi, Osaka (JP); Hirotatsu Shinomiya, Osaka (JP); Seiji Nimura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 269 days.

(21) Appl. No.: 14/765,158

(22) PCT Filed: Jan. 29, 2014

(86) PCT No.: PCT/JP2014/000462
§ 371 (c)(1),
(2) Date: Jul. 31, 2015

(87) PCT Pub. No.: WO2014/147934
PCT Pub. Date: Sep. 25, 2014

(65) Prior Publication Data
US 2015/0381733 A1    Dec. 31, 2015

(30) Foreign Application Priority Data

Mar. 21, 2013    (JP) .................................. 2013-058210

(51) Int. Cl.
*H04L 29/08*    (2006.01)
*G06F 3/06*    (2006.01)
(Continued)

(52) U.S. Cl.
CPC .......... *H04L 67/1097* (2013.01); *G06F 3/067* (2013.01); *G06F 3/0623* (2013.01);
(Continued)

(58) Field of Classification Search
CPC . H04L 41/0893; H04L 43/04; H04L 43/0829; H04L 43/0894; G06F 1/3203;
(Continued)

(56) References Cited

U.S. PATENT DOCUMENTS 5,832,210 A     11/1998  Akiyama et al.
2002/0091933 A1*  7/2002  Quick, Jr. ............. H04L 9/3271
                                               713/182
(Continued)

FOREIGN PATENT DOCUMENTS

JP       8-149122      6/1996
JP       2007-13366    1/2007
(Continued)

OTHER PUBLICATIONS

International Search Report (ISR) dated Mar. 25, 2014 in International (PCT) Application No. PCT/JP2014/000462.

*Primary Examiner* — Ruolei Zong
(74) *Attorney, Agent, or Firm* — Wenderoth, Lind & Ponack, L.L.P.

(57) ABSTRACT

A communication device according to the present invention aims to restart data transmission/reception between communication devices in a short amount of time, without performing key sharing again, even when a communication device of a transmitting side is rebooted. The communication device includes a volatile memory storing a count value, a generator generating data including a count value, a communicator transmitting data to another communication device, a storage instructor, each time the communicator transmits data, updating the volatile memory with a count (Continued)

value, and a nonvolatile memory. A count value is incremented each time the communicator transmits data, the storage instructor causes the nonvolatile memory to store a count value at certain intervals, and the generator, when the communication device is rebooted, includes in data a sum of a certain value and a count value stored in the nonvolatile memory.

11 Claims, 9 Drawing Sheets

(51) Int. Cl.
H04L 9/36 (2006.01)
H04L 9/06 (2006.01)
H04L 29/06 (2006.01)

(52) U.S. Cl.
CPC .......... *G06F 3/0653* (2013.01); *H04L 9/0637* (2013.01); *H04L 9/36* (2013.01); *H04L 63/0428* (2013.01)

(58) Field of Classification Search
CPC ... G06F 9/44; G06F 11/30; G06F 8/71; G06F 9/44505; G06F 9/4552; Y02B 60/185
USPC ........................................................ 709/217
See application file for complete search history.

(56) References Cited

U.S. PATENT DOCUMENTS

| | | | |
|---|---|---|---|
| 2009/0262718 A1* | 10/2009 | Meier ................ | G06Q 20/3674 370/338 |
| 2011/0116502 A1* | 5/2011 | Hamai ..................... | H04N 5/38 370/389 |
| 2011/0188654 A1* | 8/2011 | Yao ........................... | H04L 9/08 380/255 |
| 2012/0051546 A1 | 3/2012 | Tsurumoto | |
| 2012/0284524 A1* | 11/2012 | Ho ......................... | H04L 9/0643 713/181 |
| 2013/0217332 A1* | 8/2013 | Altman .................. | H04H 60/90 455/41.2 |
| 2014/0133656 A1* | 5/2014 | Wurster ................. | H04L 9/0637 380/270 |

FOREIGN PATENT DOCUMENTS

| | | |
|---|---|---|
| WO | 2010/007798 | 1/2010 |
| WO | 2010/134424 | 11/2010 |

* cited by examiner

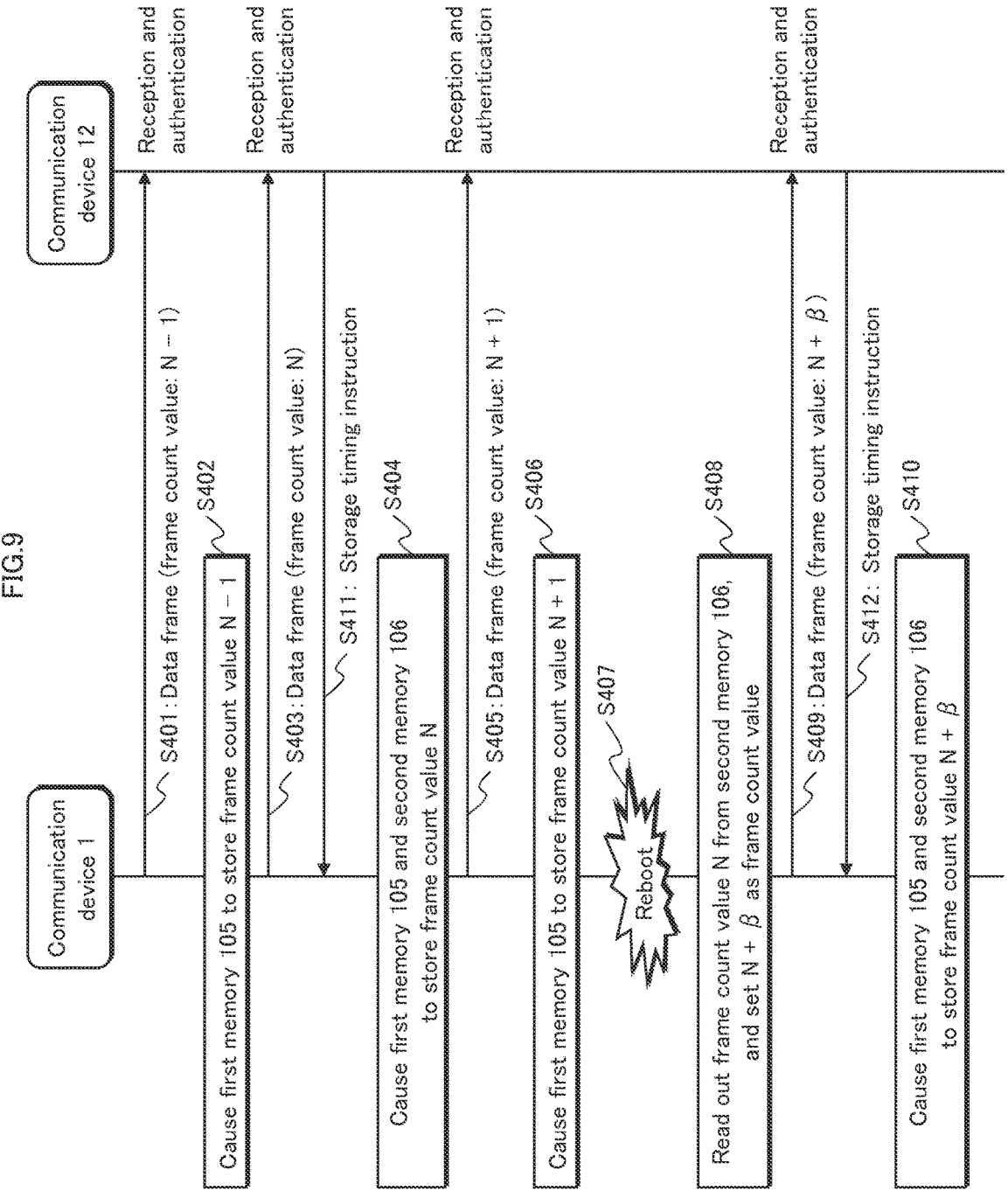

COMMUNICATION DEVICE, COMMUNICATION SYSTEM AND COMMUNICATION METHOD

TECHNICAL FIELD

The present invention relates to a communication device, a communication system, and a communication method that prevent leakage and tampering of communication data and spoofing in data communication between communication devices.

BACKGROUND ART

Conventionally, systems that transmit and receive data via communication between communication devices have been considered. In such systems, ensuring security when performing data communication between the communication devices is essential. Especially, for instance, when communicating via an open communication channel that is accessible from the outside, possibility of data leakage, tampering, and attacks including spoofing increases.

Regarding such a problem, in order to prevent replay attacks, in which an attacker spoofs the transmitter by directly reusing captured encryption data, conventional technology (for instance, Patent Literature 1) discloses a system in which both a communication device of a transmitting side and a communication device of a receiving side utilize count values. In the system, the communication device of the receiving side confirms synchronization of the communication devices by comparing a count value stored therein and a count value received from the communication device of the transmitting side.

CITATION LIST

Patent Literature

[Patent Literature 1]
 Japanese Patent Application Publication No. 2007-13366

SUMMARY OF INVENTION

Technical Problem

However, the system of Patent Literature 1 initializes the count value stored in a storage unit of an entity of the transmitting side in cases such as where the entity of the transmitting side is rebooted. Therefore, an entity of the receiving side cannot perform authentication. Also, performing the authentication again requires time because an initialization process is required for both the entity of the transmitting side and the entity of the receiving side.

The present invention has been achieved in view of the above problems, and an aim thereof is to provide a communication device, a communication system, and a communication method that can restart data transmission/reception between the communication devices in a short amount of time without performing key sharing between the communication devices again even in cases such as where the communication device of the transmitting side is rebooted.

Solution to Problem

In order to solve the above problems, a communication device according to one aspect of the present invention is a communication device that transmits a data frame to another communication device, including: a first memory that is a volatile memory, storing a count value that is utilized by the other communication device to determine whether or not a data frame that the other communication device has received and a data frame that the communication device has transmitted equal each other; a frame generator that reads out a count value currently stored in the first memory and generates a transmission data frame including a count value that is generated based on the count value currently stored in the first memory; a communicator that transmits the transmission data frame to the other communication device; a storage instructor that updates the count value currently stored in the first memory by causing the first memory to store the count value stored in the transmission data frame when the communicator transmits the transmission data frame; and a second memory that is a nonvolatile memory. In the communication device, the count value stored in the transmission data frame is generated by incrementing the count value currently stored in the first memory when the communicator transmits the transmission data frame, the storage instructor causes the second memory to store the count value stored in the transmission data frame at a certain interval, and when the communication device is rebooted, the frame generator reads out a count value currently stored in the second memory and stores to the transmission data frame, as the count value, a sum of the count value currently stored in the second memory and a predetermined value.

These general and specific aspects may be implemented using a system, a method, an integrated circuit, a computer program, or a computer-readable recording medium such as a CD-ROM, or any combination of the system, the method, the integrated circuit, the computer program, or the computer-readable recording medium.

Advantageous Effects of Invention

The present aspect eliminates the need of performing key sharing between the communication devices again even in cases such as where the communication device of the transmitting side is rebooted, therefore enabling data transmission/reception to be restarted in a short amount of time. Also, a frequency at which data is written to the nonvolatile memory decreases. As a result, deterioration of the nonvolatile memory of the communication device of the transmitting side can be suppressed and a possibility that the communication device fails can be reduced.

BRIEF DESCRIPTION OF DRAWINGS

FIG. 9 is one example of a communication sequence between the communication devices according to embodiment 2.

Figure 1:
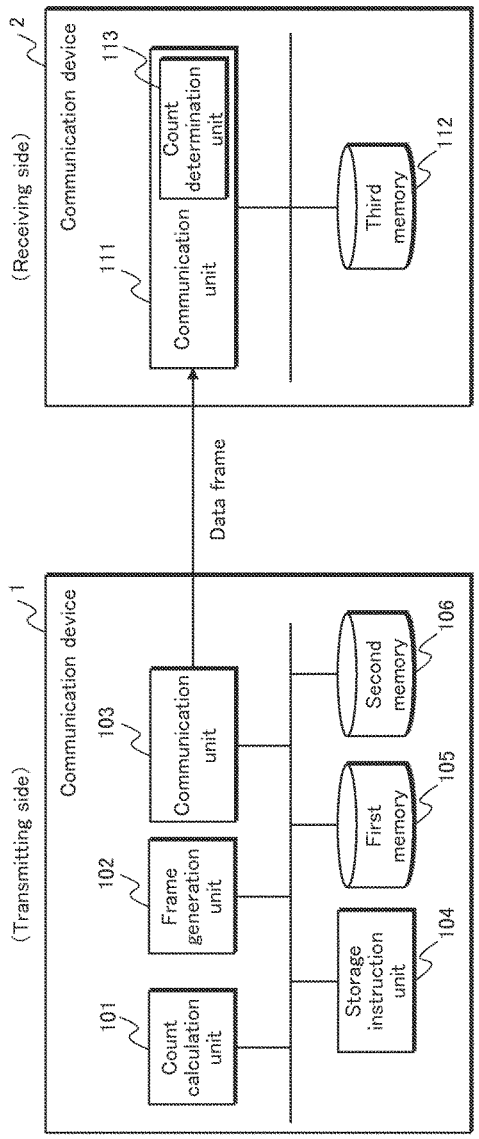
FIG. 1 is one example of a functional block diagram of a communication device according to embodiment 1.

DESCRIPTION OF EMBODIMENTS (1) A communication device according to one aspect of the present invention is a communication device that transmits a data frame to another communication device, including: a first memory that is a volatile memory, storing a count value that is utilized by the other communication device to determine whether or not a data frame that the other communication device has received and a data frame that the communication device has transmitted equal each other; a frame generator that reads out a count value currently stored in the first memory and generates a transmission data frame including a count value that is generated based on the count value currently stored in the first memory; a communicator that transmits the transmission data frame to the other communication device; a storage instructor that updates the count value currently stored in the first memory by causing the first memory to store the count value stored in the transmission data frame when the communicator transmits the transmission data frame; and a second memory that is a nonvolatile memory. In the communication device, the count value stored in the transmission data frame is generated by incrementing the count value currently stored in the first memory when the communicator transmits the transmission data frame, the storage instructor causes the second memory to store the count value stored in the transmission data frame at a certain interval, and when the communication device is rebooted, the frame generator reads out a count value currently stored in the second memory and stores to the transmission data frame, as the count value, a sum of the count value currently stored in the second memory and a predetermined value.

(2) In (1), for instance, the certain interval may be an interval from storing of the count value currently stored in the second memory to when the count value stored in the transmission data frame becomes greater than the count value currently stored in the second memory by a certain value.

This aspect can decrease a frequency at which data is written to the nonvolatile memory of a communication device. As a result, deterioration of the nonvolatile memory can be suppressed and a possibility that the communication device of the transmitting side fails can be reduced.

(3) In (1), for instance, the certain interval may be an interval from storing of the count value currently stored in the second memory to when the communicator has transmitted the transmission data frame a certain number of times.

This aspect can decrease a frequency at which data is written to the nonvolatile memory of the communication device.

As a result, deterioration of the nonvolatile memory can be suppressed and a possibility that the communication device of the transmitting side fails can be reduced.

(4) In (1), for instance, the certain interval may be a predetermined amount of time.

This aspect can, even in cases such as where the communication device of the transmitting side is rebooted, restart data transmission/reception between the communication devices in a short amount of time without performing key sharing between the communication devices again.

(5) In any one of (1)-(4), for instance, the predetermined value, which the frame generator adds to the counter value currently stored in the second memory as a value to be stored in the transmission data frame when the communication device is rebooted, may be an increase in the count value stored in the transmission data frame during the certain interval.

This aspect can, even in cases such as where the communication device of the transmitting side is rebooted, restart data transmission/reception between the communication devices in a short amount of time.

(6) In any one of (1)-(4), for instance, the predetermined value, which the frame generator adds to the counter value currently stored in the second memory as a value to be stored in the transmission data frame when the communication device is rebooted, may be calculated from the frequency and the certain interval.

(7) In (6), for instance, the predetermined value may be a product of the frequency and the certain interval.

This aspect can prevent the count value stored in the volatile memory from increasing excessively. Further, this aspect can restart data transmission/reception between the communication devices in a short amount of time.

(8) In any one of (1)-(8), for instance, the predetermined value, which the frame generator adds to the counter value currently stored in the second memory as a value to be stored in the transmission data frame when the communication device is rebooted, may be a value smaller than an increase in the count value stored in the transmission data frame during the certain interval.

This aspect can prevent the count value stored in the volatile memory from increasing excessively. Further, this aspect can restart data transmission/reception between the communication devices in a short amount of time.

(9) In (8), for instance, when the transmission data frame is not authenticated by the other communication device, a value larger than the predetermined value may be added to the count value read out from the second memory.

This aspect can prevent the count value stored in the volatile memory from increasing excessively. Further, this aspect can restart data transmission/reception between the communication devices in a short amount of time.

(10) Any one of (1)-(9) may, for instance, include a storage interval receiver that receives an instruction related to the certain interval.

Even when a plurality of communication devices are provided at the transmitting side and each of the communication devices transmits a data frame at different timing, this aspect enables each of the communication devices of the transmitting side to transmit a data frame at appropriate timing.

(11) A communication method according to one aspect of the present invention may be a communication method of a data frame performed by a communication device that transmits a data frame to another communication device, including: storing in a first memory that is a volatile memory, a count value that is utilized by the other communication device to determine whether or not a data frame that the other communication device has received and a data frame that the communication device has transmitted equal each other; reading out a count value currently stored in the first memory and generating a transmission data frame including a count value that is generated based on the count value currently stored in the first memory; transmitting the transmission data frame to the other communication device;

updating the count value currently stored in the first memory by causing the first memory to store the count value stored in the transmission data frame when the transmitting transmits the transmission data frame; generating the count value stored in the transmission data frame by incrementing the count value currently stored in the first memory when the transmitting transmits the transmission data frame; causing the second memory to store the count value stored in the transmission data frame at a certain interval; and when the communication device is rebooted, reading out a count value currently stored in the second memory and storing to the transmission data frame, as the count value, a sum of the count value currently stored in the second memory and a predetermined value.

(12) A communication system according to one aspect of the present invention may be a communication system that transmits a data frame from a first communication device to a second communication device. In the communication system, the first communication device includes a first memory that is a volatile memory, storing a count value that is utilized by the second communication device to determine whether or not a data frame that the second communication device has received and a data frame that the first communication device has transmitted equal each other, a frame generator that reads out a count value currently stored in the first memory and generates a transmission data frame including a count value that is generated based on the count value currently stored in the first memory, a communicator that transmits the transmission data frame to the second communication device, a storage instructor that updates the count value currently stored in the first memory by causing the first memory to store the count value stored in the transmission data frame when the communicator transmits the transmission data frame, and a second memory that is a nonvolatile memory. In the first communication device, when the first communication device is rebooted, the frame generator reads out a count value currently stored in the second memory and stores to the transmission data frame, as the count value, a sum of the count value currently stored in the second memory and a predetermined value. The second communication device receives a data frame transmitted from the first communication device, and authenticates whether a data frame that the second communication device has received and a data frame that the first communication device has transmitted equal each other.

Embodiments of the present invention are described below with reference to the drawings.

Each of the embodiments described below illustrates a general or specific example.

The numerical values, shapes, structural elements, positions and connection forms of the structural elements, processing steps, the order of the steps etc., shown in the following embodiments are mere examples. Therefore, the present invention is not limited by these embodiments. Furthermore, among the structural elements in the following embodiments, structural elements not recited in any one of the independent claims most broadly defining the inventive concept of the present invention are described as arbitrary structural elements.

Embodiment 1

A communication device according to embodiment 1 is a communication device that includes a nonvolatile memory in addition to a volatile memory and causes the nonvolatile memory to store a count value at certain intervals. When rebooted, the communication device according to embodiment 1 reads out a count value stored in the nonvolatile memory, generates a data frame containing a sum of the read count value and a certain value, and transmits the data frame to another communication device.

FIG. 1 illustrates one example of a functional block diagram of a communication device 1 and a communication device 2 according to embodiment 1.

The communication device 1, which is a communication device of a transmitting side, includes a count calculation unit 101, a frame generation unit 102, a communication unit 103, a storage instruction unit 104, a first memory 105, and a second memory 106.

The count calculation unit 101 calculates a frame count value to store to a header 201 of a data frame. Specifically, the count calculation unit 101 calculates a frame count value to store to the header 201 of a data frame, by adding one to either a frame count value read out from the first memory 105 or a frame count value read out from the second memory 106.

The frame generation unit 102 generates the header 201 by utilizing the frame count value that the count calculation unit 101 calculates and the like. Also, the frame generation unit 102 generates a tampering detection code to prevent tampering, based on a portion of the header 201 and communication data before encryption. Furthermore, the frame generation unit 102 generates an encrypted payload 202 and an encrypted tampering detection code 203 by respectively encrypting the communication data and the tampering detection code, thereby generating a data frame. The frame generation unit 102 may include the count calculation unit 101. Contents of a data frame are described utilizing FIG. 2.

The communication unit 103 transmits the data frame generated by the frame generation unit 102 to the communication device 2.

The storage instruction unit 104 causes the first memory 105 to store the frame count value stored in the data frame that is transmitted. The storing is performed each time the communication unit 103 transmits one data frame to the communication device 2. Also, the storage instruction unit 104 causes the second memory 106 to store the frame count value stored in the data frame transmitted by the communication unit 103 if the frame count value stored in the data frame that is transmitted becomes greater than the count value currently stored in the second memory by a certain value. The storage instruction unit 104 may cause the second memory 106 to store a frame count value each time the communication unit 103 has transmitted data frames to the communication device 2 a fixed or unfixed number of times. Alternatively, the storage instruction unit 104 may cause the second memory 106 to store a frame count value upon elapse of a fixed or unfixed amount of time. When to cause a count value to be stored is not limited to these examples.

The first memory 105 is a volatile memory, and when a power source of the communication device 1 is turned off, or when the communication device 1 is rebooted etc., contents in the first memory 105 are lost.

The second memory 106 is a nonvolatile memory, and even when the power source of the communication device 1 is turned off, or the communication device 1 is rebooted etc., contents in the second memory 106 are maintained.

The communication device 2, which is a communication device of a receiving side, includes a communication unit 111, a third memory 112, and a count determination unit 113.

The communication unit 111 includes the count determination unit 113. The communication unit 111 receives a data frame transmitted from the communication device 1. Also, the communication unit 111 transmits an ACK to the communication device 1 when the communication unit 111 authenticates that the newly received data frame is a data frame transmitted from the communication device 1, i.e., a correct communication device.

The third memory 112 stores a frame count value stored in a data frame previously received from the communication device 1, i.e., the same communication device.

The count determination unit 113 acquires the frame count value stored in the header 201 of the data frame which the communication unit 111 has newly received and the frame count value currently stored in the third memory 112. Next, the count determination unit 113 compares the frame count value stored in the newly received data frame and the frame count value currently stored in the third memory 112. Here, if the frame count value stored in the newly received data frame is equal to or smaller than the frame count value in currently stored in the third memory 112, the communication unit 111 discards the newly received data frame. If the frame count value in the newly received data frame is larger than the frame count value currently stored in the third memory 112, the communication unit 111 decrypts the encrypted payload 202 and the encrypted tampering detection code 203 in the newly received data frame. When a value calculated from the decrypted payload and a portion of the header including the frame count value equals the decrypted tampering detection code, the communication unit 111 authenticates that the newly received data frame is a data frame transmitted from the communication device 1, i.e., a correct communication device.

This can prevent leakage and tampering of communication data and spoofing, and ensure secure data communication between communication devices.

The communication device 1 may include the functional units of the communication device 2, and in such a case, the communication device 1 can perform data communication with another communication device 1 with the same configuration.

Figure 2:
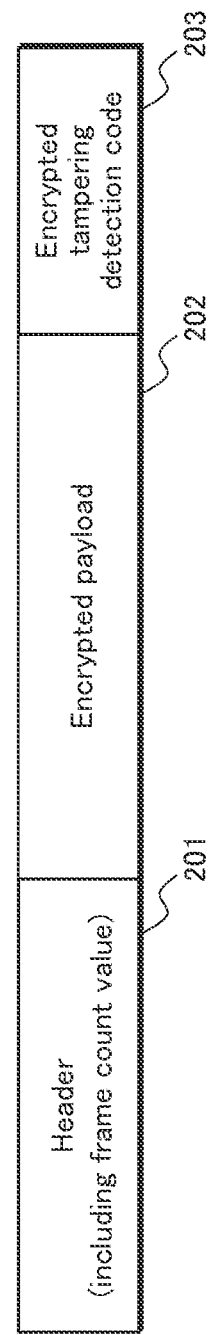
FIG. 2 illustrates one example of a configuration of a data frame transmitted and received between communication devices according to embodiment 1.

FIG. 2 illustrates one example of a configuration of a data frame that is transmitted and received between the communication devices according to embodiment 1 of the present invention. In FIG. 2, the data frame includes the header 201, the encrypted payload 202, and the encrypted tampering detection code 203.

The header 201 includes the frame count value and address information of the communication device 1.

The encrypted payload 202 is communication data encrypted with a common key encryption scheme such as an AES-Counter with a CBC-MAC (AES-CCM), by using nonce generated from the frame count value, the address information, etc., of the communication device 1.

The encrypted tampering detection code 203 is obtained by encrypting the tampering detection code in the same way as the communication data. The encrypted tampering detection code 203 is calculated based on the communication data before encryption and the portion of the header 201 including the frame count value, and is used to guarantee completeness of data.

Hereinafter, how the communication device 1 according to embodiment 1 operates in data communication is described utilizing FIG. 3-FIG. 7.

Figure 3:
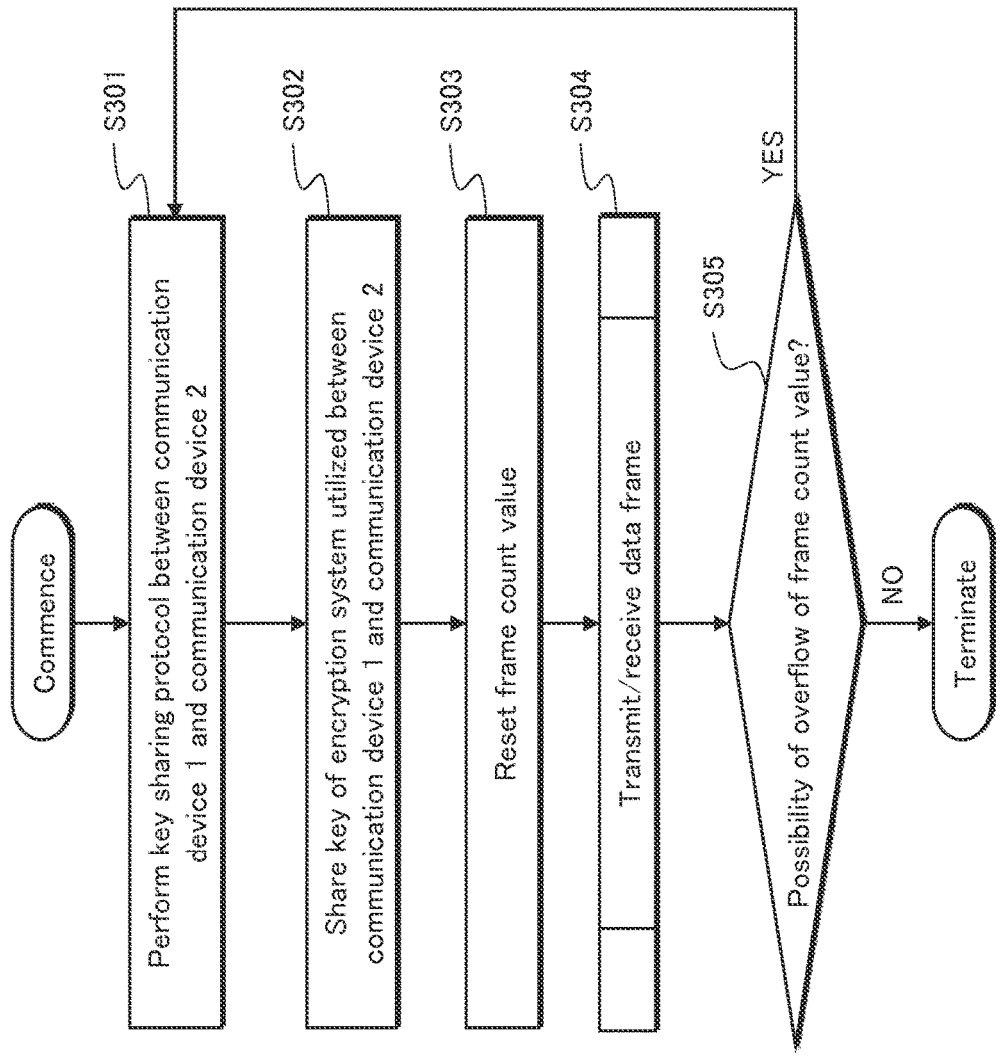
FIG. 3 is a flowchart illustrating how key sharing is performed between the communication devices according to embodiment 1.

FIG. 3 is a flowchart illustrating how key sharing is performed between the communication devices according to embodiment 1.

First, the communication device 1 performs a key sharing protocol with the communication device 2 (S301), and shares a key conforming to the encryption system being used with the communication device 2 (S302).

Next, the communication device 1 resets a frame count value to be stored to a data frame (S303), and transmits the data frame, which is received by the communication device 2 (S304).

When the communication device 1 determines that the possibility of frame count value overflow in the communication device 2 exists (YES in S305), the process may return to S301 and the communication device 1 may perform the key sharing protocol again, whereinafter the communication device 1 updates the common key and resets the frame count value. A trigger of the update of the common key is not limited to this example, and the key sharing protocol may be performed again from the communication device 1.

Figure 4:
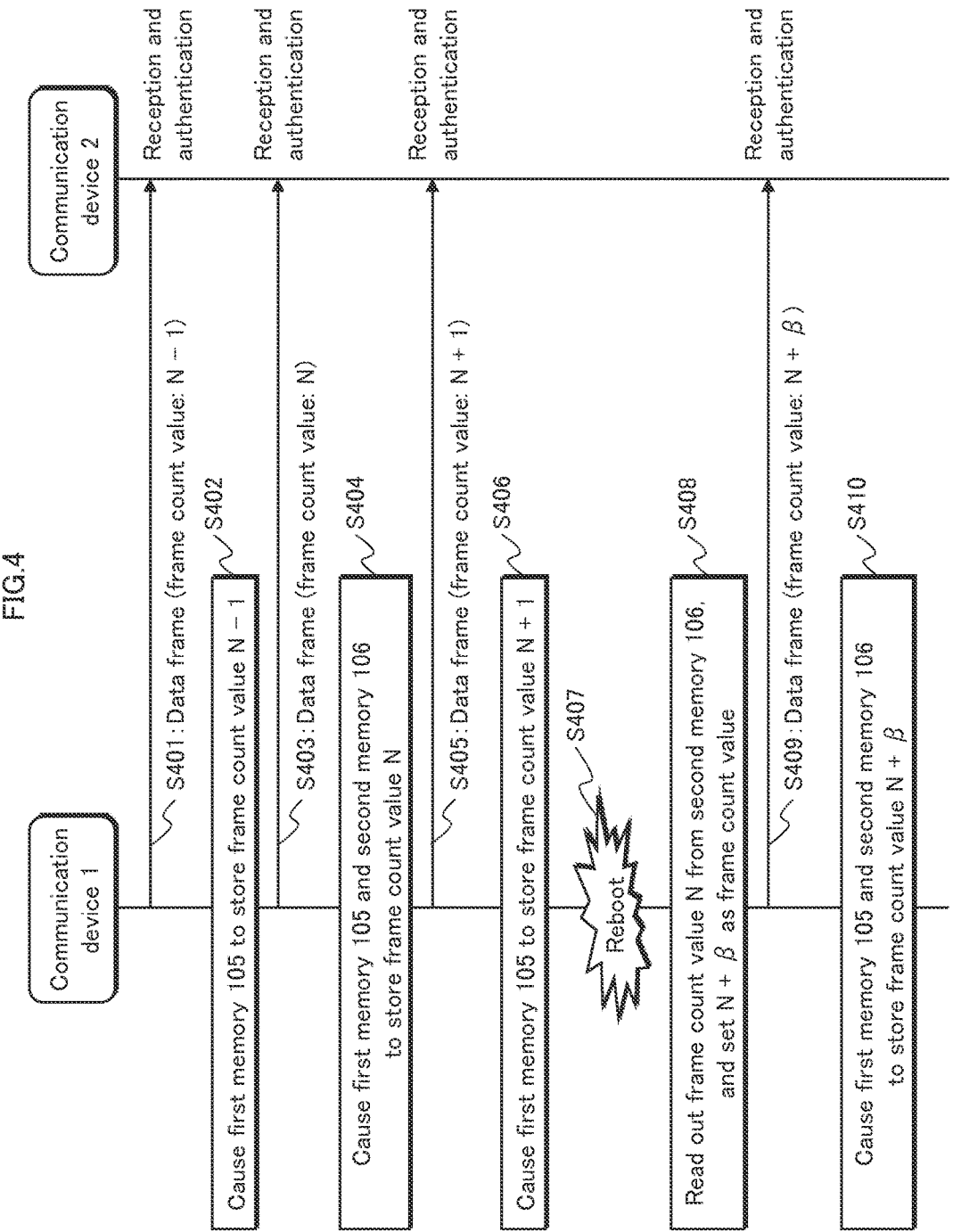
FIG. 4 is one example of a communication sequence between the communication devices according to embodiment 1.

FIG. 4 illustrates one example of a communication sequence between the communication devices according to embodiment 1.

Here, a value that the count calculation unit 101 adds to a frame count value is 1.

Also, here, the storage instruction unit 104 causes the second memory 106 to store a frame count value if the count value in the transmission data frame becomes greater than the count value currently stored in the second memory by a certain value $\alpha$. However, when to cause a frame count value to be stored is not limited to this example. That is, the storage instruction unit 104 may cause the second memory 106 to store a frame count value each time the communication unit 103 has transmitted data frames certain number of times. Alternatively, the storage instruction unit 104 may cause the second memory 106 to store a frame count value upon elapse of a predetermined amount of time (for instance, one minute or one hour) from storing of the count value currently stored in the second memory 106.

Also, here, a value ($\beta$) that the count calculation unit 101 adds to a frame count value currently stored in the second memory 106 when the communication device 1 is rebooted is a predetermined value larger than $\alpha$, but the value ($\beta$) is not limited to this example. Other possible values of $\beta$ are described later.

First, the communication unit 103 transmits a data frame containing a frame count value N−1 to the communication device 2 (S401). Here, the storage instruction unit 104 causes the first memory 105 to store the frame count value N−1 stored in the data frame that is transmitted (S402).

Next, the communication unit 103 transmits a data frame containing a frame count value N to the communication device 2 (S403). Here, if the frame count value currently stored in the second memory 106 is N−$\alpha$, and a difference between the frame count value N−$\alpha$ currently stored in the second memory 106 and the frame count value N stored in the data frame that the communication unit 103 transmits to the communication device 2 equals $\alpha$. In such a case, the storage instruction unit 104 causes both the first memory 105 and the second memory 106 to store the frame count value N stored in the data frame that is transmitted (S404).

Next, in the same way as S401, the communication unit 103 transmits a data frame containing a frame count value N+1 to the communication device 2 (S405). Here, in the same way as S402, the storage instruction unit 104 causes the first memory 105 to store the frame count value N+1 stored in the data frame that is transmitted (S406).

Here, when the communication device 1 is rebooted (S407), the count calculation unit 101 reads out the frame count value N currently stored in the second memory 106. The count calculation unit 101 calculates a frame count value N+$\beta$ to store to the header 201 of a data frame that is transmitted to the communication device 2, by adding $\beta$ to the read frame count value N (S408).

Then, in the same way as S403, the communication unit 103 transmits the data frame containing the frame count value N+β to the communication device 2 (S409). Here, in the same way as S404, the storage instruction unit 104 causes the first memory 105 and the second memory 106 to store the frame count value N+β stored in the data frame that is transmitted (S410).

Figure 5:
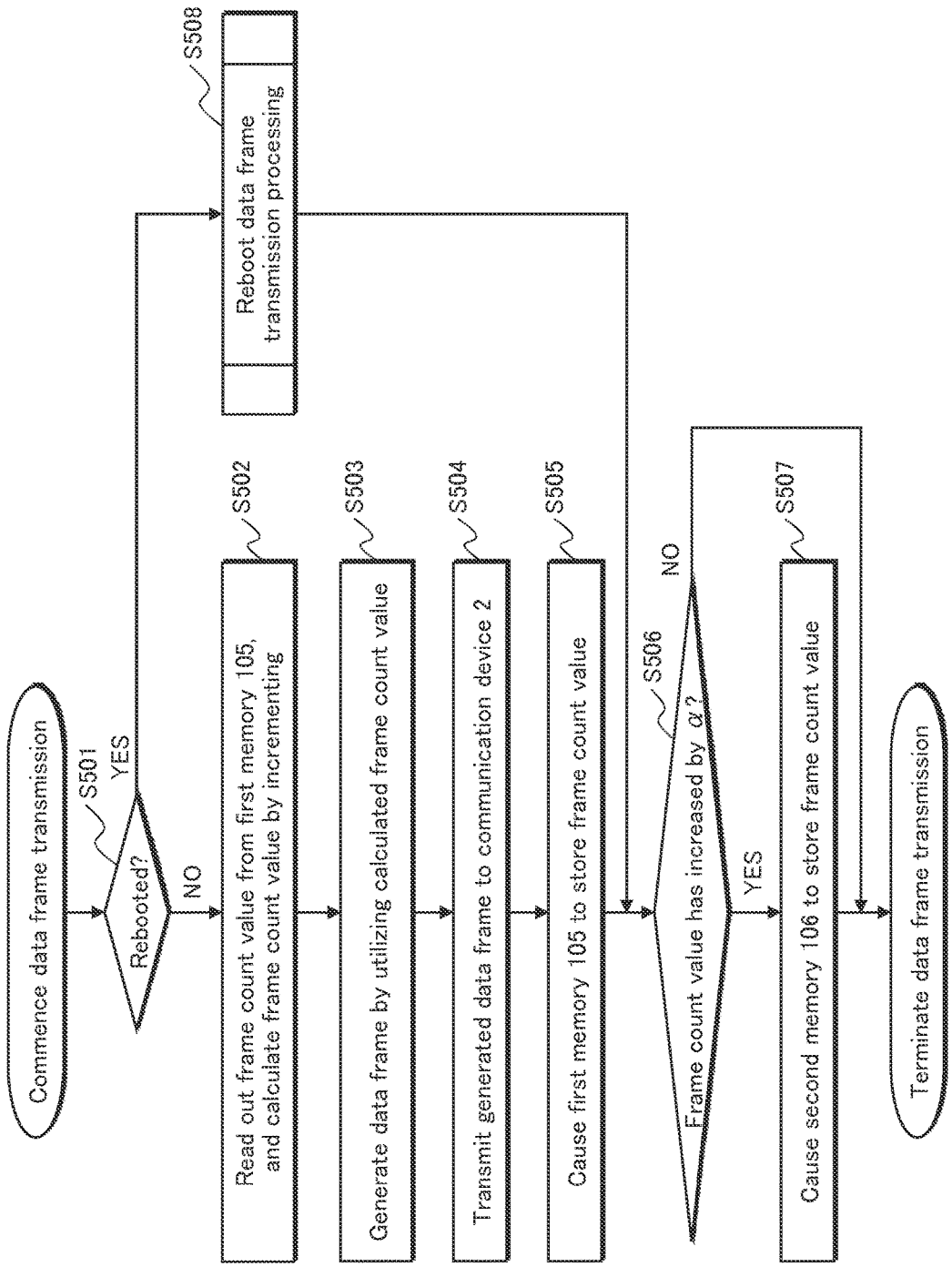
FIG. 5 is a flowchart illustrating how the communication device according to embodiment 1 (transmitting side) operates.

FIG. 5 is a flowchart illustrating how the communication device 1 according to embodiment 1 (transmitting side) operates.

First, the communication device 1 determines whether the communication device 1 has been rebooted or not (S501).

When the communication device 1 is not rebooted (NO in S501), the count calculation unit 101 reads out a frame count value currently stored in the first memory 105 in response to a data transmission request to the communication device 1 from an upper layer such as an application. Next, the count calculation unit 101 calculates a new frame count value by incrementing the frame count value that is read out from the first memory 105 (S502).

When the communication device 1 is rebooted (YES in S501), a reboot data frame transmission/reception process is performed (S508). The reboot data frame transmission/reception process is described later, utilizing FIG. 6. In FIG. 5, whether the communication device 1 is rebooted or not is determined at the beginning of the data frame transmission process. When to perform the determination is not limited to this example. That is, when the communication device 1 is rebooted in or after S502, any process until then may be initialized and the process in S508 may be performed.

The frame generation unit 102 generates a header 201 including the frame count value calculated in S502 and the like, an encrypted payload 202, which is acquired by encrypting the communication data, and an encrypted tampering detection code 203, and thereby generates a data frame that is transmitted (S503).

The communication unit 103 transmits the data frame generated in S503 to the communication device 2 (S504).

The storage instruction unit 104 causes the first memory 105 to store the frame count value in the data frame that is transmitted (S505).

Next, the storage instruction unit 104 determines whether the frame count value stored in the data frame that is transmitted has increased from the value currently stored in the second memory 106 by a value larger than or equal to a (S506).

When the frame count value stored in the data frame that is transmitted has increased from the value currently stored in the second memory 106 by a value larger than or equal to a (YES in S506), the storage instruction unit 104 causes the second memory 106 to store the frame count value stored in the data frame that is transmitted (S507).

Figure 6:
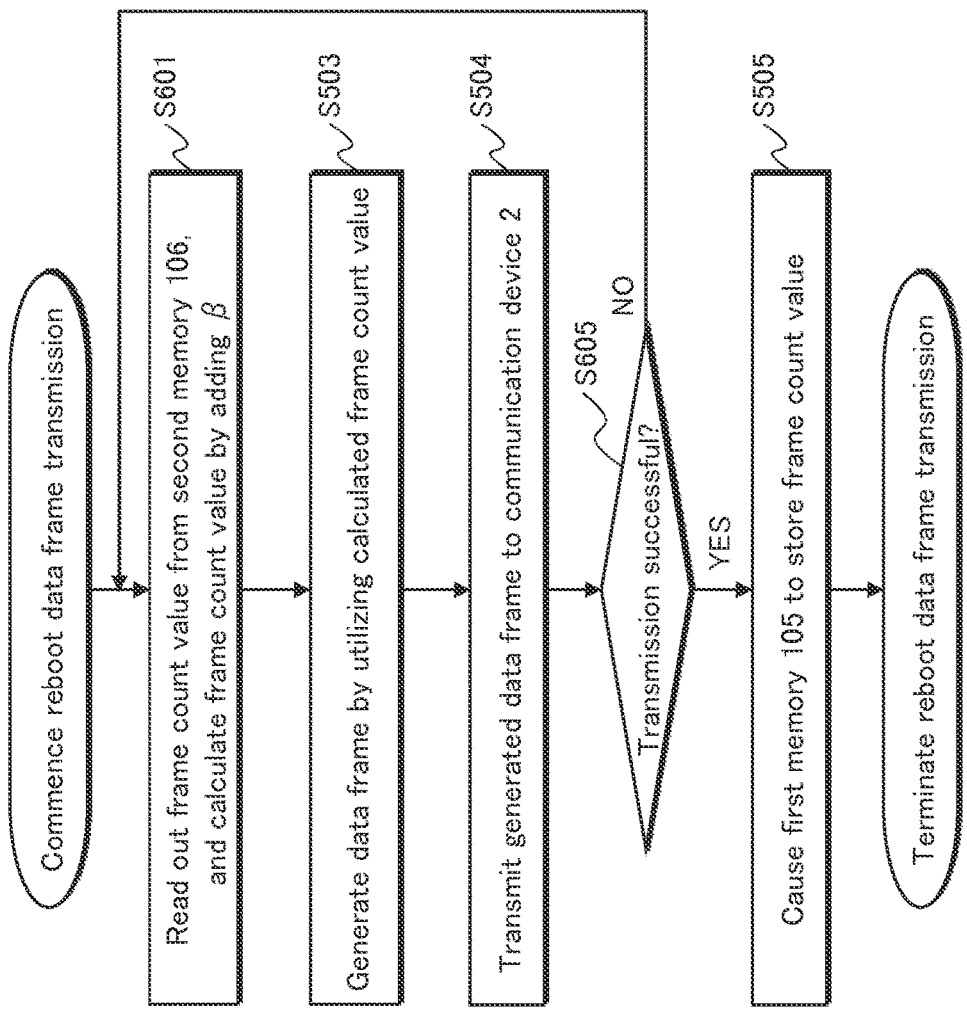
FIG. 6 is a flowchart illustrating a data frame transmission process after the communication device according to embodiment 1 (transmitting side) is rebooted.

Next, the data frame transmission process after the communication device 1 (transmitting side) is rebooted is described utilizing FIG. 6.

The same reference signs are used for the processes that are also performed when the communication device 1 is not rebooted (YES in S501) and explanation on such processes is omitted in the following.

When the communication device 1 receives a data transmission request from an upper layer such as an application, the count calculation unit 101 reads out a frame count value from the second memory 106. Next, the count calculation unit 101 calculates a sum of β and the read frame count value as a new frame count value (S601). Then, the communication device 1 performs the processes in S503 and S504.

Next, the communication device 1 determines that the data frame transmission is successful when receiving an ACK transmitted from the communication device 2 (S605). When the transmission is not successful (NO in S605), the process returns to S601, and a frame count value to be transmitted is calculated again. On the other hand, when the transmission is successful (YES in S605), the communication device 1 performs the process in S505.

Figure 7:
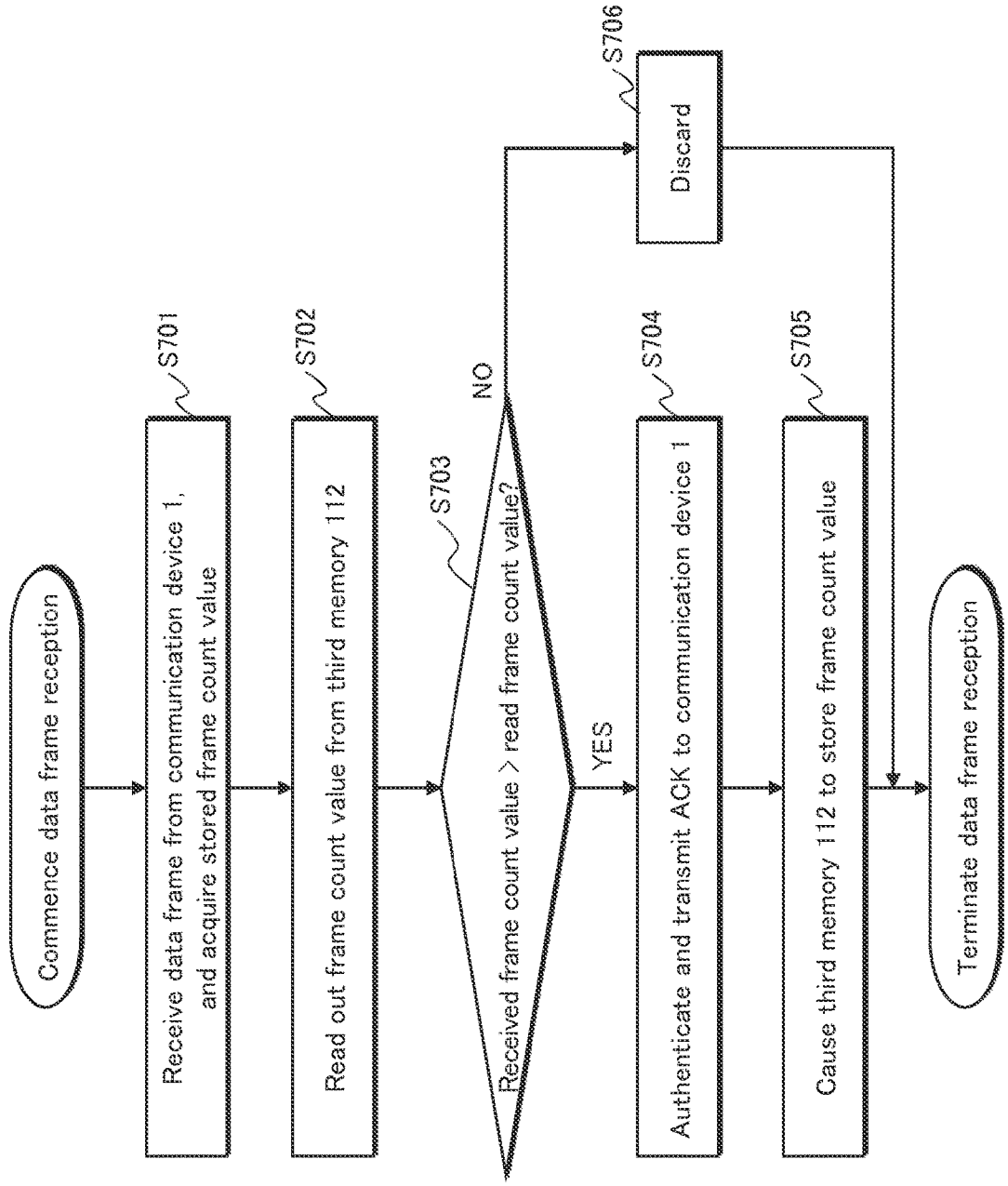
FIG. 7 is a flowchart illustrating how the communication device according to embodiment 1 (receiving side) operates.

FIG. 7 is a flowchart illustrating how the communication device 2 according to embodiment 1 (receiving side) operates.

First, the communication unit 111 receives a data frame transmitted from the communication device 1. Then, the count determination unit 113 acquires the frame count value and address information of the communication device 1 stored in the header 201 of the data frame that the communication unit 111 has newly received (S701).

Next, the count determination unit 113 reads out the count value currently stored in the third memory 112, i.e., a frame count value stored in a data frame previously received from the same communication device 1 (S702).

The count determination unit 113 compares the frame count value stored in the newly received data frame and the frame count value that is read out from the third memory 112 (S703).

When the frame count value stored in the newly received data frame is larger than the frame count value that is read out from the third memory 112 (YES in S703), the communication unit 111 decrypts the encrypted payload 202 of the received data frame. When a value calculated from the decrypted payload and a portion of the header including the frame count value in the newly received data frame equals the received encrypted tampering detection code 203, the communication unit 111 authenticates that the newly received data frame is a data frame transmitted from a correct communication device 1. Then, the communication unit 111 transmits an ACK to the communication device 1 (S704).

Next, the communication unit 111 causes the third memory 112 to store the frame count value stored in the newly received data frame (S705).

On the other hand, when the frame count value stored in the newly received data frame is equal to or smaller than the frame count value currently stored in the third memory 112 (NO in S703), the communication unit 111 discards the newly received data frame (S706).

The communication device 1 according to embodiment 1 does not cause the second memory 106 to store a frame count value each time a data frame is transmitted but when a frame count value stored in a data frame becomes larger than the frame count value currently stored in the second memory 106 by a predetermined value α. This can decrease the number of accesses to the second memory 106. As a result, replay attacks by spoofing can be prevented without shortening the life of the nonvolatile memory. Also, because the key sharing protocol with a communication-opponent communication device does not have to be performed again after rebooting, communication can be restarted immediately after the communication device 1 is rebooted.

Also, the value (β) that the count calculation unit 101 adds to the frame count value stored in the second memory 106 when the communication device 1 is rebooted may be an estimate value of a maximum number of data frames that the communication device 1 transmits during a certain period of time. That is, the value (β) may be a product of a frequency at which the communication unit 103 transmits data frames and the certain interval of time at which the storage instruction unit 104 causes the second memory 106 to store a frame count value.

This estimate value can be set as a predetermined value when the system is designed, or the communication device 1 can adaptively set an estimate value from statistical information of actual communication.

Also, the value ($\beta$) that the count calculation unit 101 adds to the frame count value currently stored in the second memory 106 when rebooting the communication device 1 may be a value smaller than a. In this case, the count calculation unit 101 first reads out a frame count value currently stored in the second memory 106. Then, the count calculation unit 101 calculates, as a new frame count value, a sum of the value smaller than a (for instance, $\alpha/8$) and the frame count value that is read out from the third memory 106. If transmission is not successful, the count calculation unit 101 recalculates a new frame count value by adding a value that is larger than the value added the last time data frame transmission has been performed and that is equal to or smaller than a (for instance, $\alpha/4$). The communication device 1 performs the above process repeatedly until the data frame is successfully transmitted.

The present embodiment can reduce a possibility that the frame count value overflows, even when a value range of the frame count value is limited, and the communication device 1 is rebooted many times and the frame count value increases each time the communication device 1 is rebooted.

Also, in the communication device 2, the count determination unit 113 compares a frame count value of a data frame previously received from the same communication device 1, which is currently stored in the third memory 112, and a frame count value stored in the header 201 of the data frame which the communication unit 111 has newly received. If the count determination unit 113 determines that the newly received frame count value is equal to or larger by $\beta+1$ than the frame count value currently stored in the third memory 112, the communication unit 111 may discard the newly received data frame.

This can limit a range of the frame count value of the received data frame. As a result, security against replay attacks by spoofing can be improved.

Also, when the transmission of the data frame fails (when the existence of the communication device 2 is not confirmed), the communication device 1 may refrain from the transmission of the data frame until the existence of the communication device 2 is confirmed. Here, in order to confirm the existence of the communication device 2, control frames etc. which the communication device 2 constantly transmits to the communication device 1 may be utilized. The control frames may be, for instance, beacon frames or Link Status frames.

Also, the storage instruction unit 104 may cause the second memory 106 to store, along with a frame count value of the latest data frame that is successfully transmitted, a timestamp of the latest data frame. Here, when the communication device 1 is rebooted, the count calculation unit 101 may make an estimation by considering the number of times the frame count value is expected to be updated per unit time.

This concludes description of the communication device according to embodiment 1 utilizing FIG. 1-FIG. 7.

The present embodiment can, even in cases such as where the communication device of the transmitting side is rebooted, restart data transmission/reception between communication devices in a short amount of time without performing key sharing between the communication devices again. Also, the present embodiment can decrease the frequency at which data is written to the nonvolatile memory. As a result, deterioration of the nonvolatile memory in the communication device is suppressed and the possibility that the communication device of the transmitting side fails can be reduced.

Embodiment 2

In embodiment 1, the storage instruction unit 104 of the communication device 1 determines the certain interval, and causes the second memory 106 to store a frame count value. On the other hand, in embodiment 2, a communication device 1 receives from a communication device 12 of the receiving side an instruction with regard to timing to cause the second memory 106 to store a frame count value. The communication device 1 according to embodiment 2 causes the second memory 106 to store the frame count value based on this timing. The communication device 1 according to the present embodiment differs from the communication device 1 according to embodiment 1 in this respect.

Hereinafter, communication devices according to embodiment 2 are described utilizing FIG. 8 and FIG. 9.

In the description of the communication device 1 and the communication device 12 of embodiment 2 below, the same reference signs are used for structural elements that are also described in the communication device 1 and the communication device 2 of embodiment 1 and explanation on such elements is omitted in the following.

Figure 8:
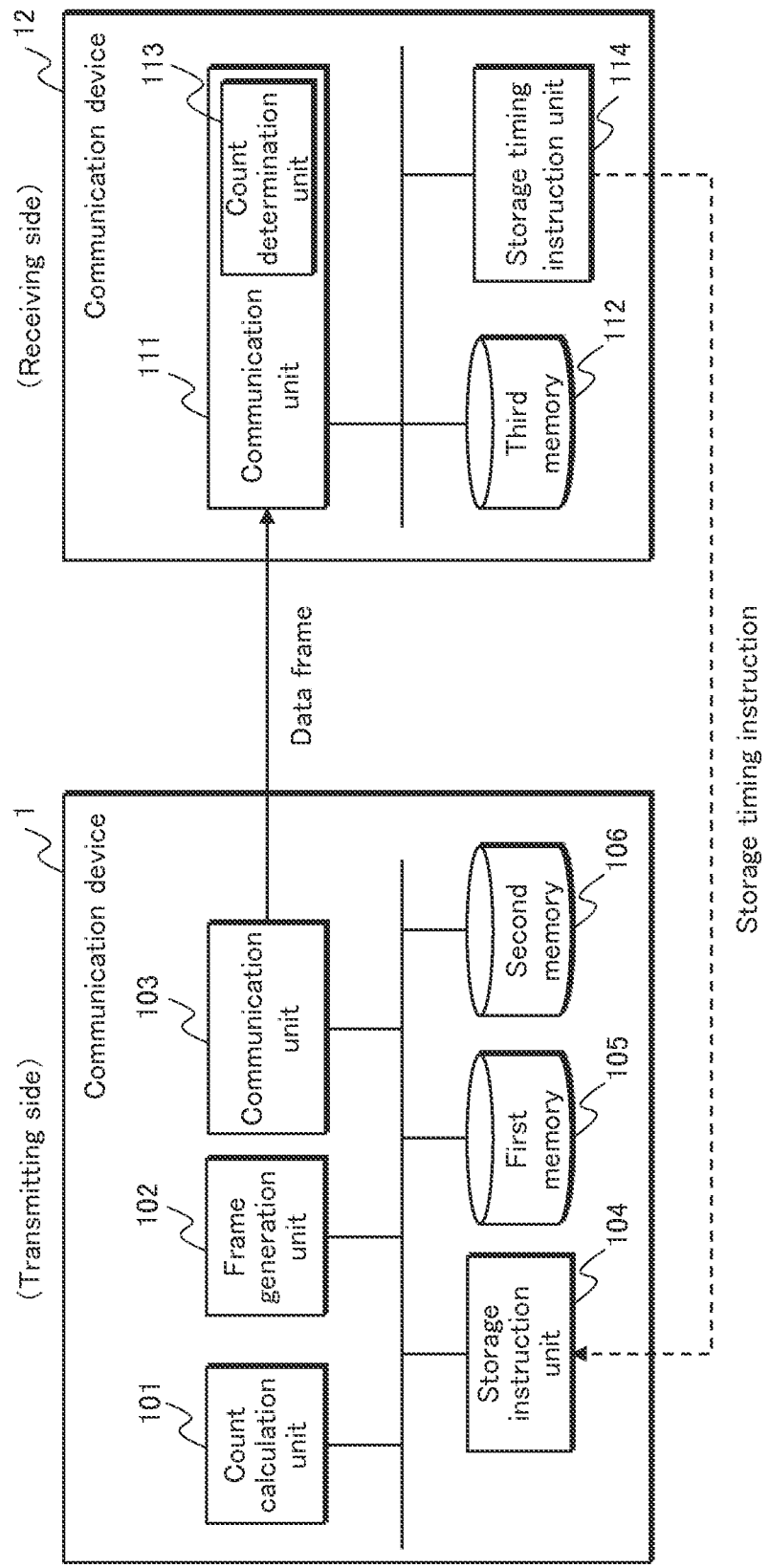
FIG. 8 is one example of a functional block diagram of a communication device according to embodiment 2.

FIG. 8 illustrates one example of a functional block diagram of the communication device 1 and the communication device 12 according to embodiment 2.

The communication device 12 includes a communication unit 111, a third memory 112, a count determination unit 113, and a storage timing instruction unit 114.

The storage timing instruction unit 114 transmits a storage timing instruction to the communication unit 111 to instruct timing at which the storage instruction unit 104 of the communication device 1 causes the second memory 106 to store a frame count value. The communication unit 111 transmits the storage timing instruction to the communication unit 103 of the communication device 1.

The communication unit 103 of the communication device 1 receives the storage timing instruction from the communication unit 111 of the communication device 12.

Next, the storage instruction unit 104 receives the storage timing instruction that the communication unit 103 has received and causes the second memory 106 to store a frame count value.

FIG. 9 illustrates one example of a communication sequence between the communication devices according to embodiment 2.

The communication device 12 acquires a frame count value stored in the received data frame (S403). Next, the storage timing instruction unit 114 instructs the timing of storage to the communication device 1 when the storage timing instruction unit 114 determines that the certain timing at which the storage instruction unit 104 should cause the second memory 106 to store a frame count value has arrived (S411).

The storage instruction unit 104 receives the storage timing instruction from the storage timing instruction unit 114 and causes the second memory 106 to store the frame count value (S404).

The same process is performed when the communication device 12 receives a data frame after the communication device 1 is rebooted.

This concludes description of the communication device 1 and the communication device 12 of embodiment 2 utilizing FIG. 8 and FIG. 9.

The above description is merely exemplary of the invention in all respects and not intended to limit the scope thereof. Also, it goes without saying that various modifications and variations can be made to embodiment 1 or embodiment 2 without departing from the scope of the invention.

INDUSTRIAL APPLICABILITY

A communication device, a communication system, and a communication method of the present invention can be used in networks and systems and the like that require security.

REFERENCE SIGNS LIST 1, 2, 12 communication device
101 count calculation unit
102 frame generation unit
103, 111 communication unit
104 storage instruction unit
105 first memory
106 second memory
112 third memory
113 count determination unit
114 storage timing instruction unit
201 header
202 encrypted payload
203 encrypted tampering detection code

The invention claimed is:

1. A communication device that transmits a data frame to another communication device, comprising:
a first memory that is a volatile memory, storing a count value that is utilized by the other communication device to determine whether or not a data frame that the other communication device has received and a data frame that the communication device has transmitted equal each other;
a frame generator that reads out a count value currently stored in the first memory and generates a transmission data frame including a count value that is generated based on the count value currently stored in the first memory;
a communicator that transmits the transmission data frame to the other communication device;
a storage instructor that updates the count value currently stored in the first memory by causing the first memory to store the count value stored in the transmission data frame when the communicator transmits the transmission data frame; and
a second memory that is a nonvolatile memory, wherein the count value stored in the transmission data frame is generated by incrementing the count value currently stored in the first memory when the communicator transmits the transmission data frame,
the storage instructor causes the second memory to store the count value stored in the transmission data frame at a certain interval,
when the communication device is rebooted, the frame generator reads out a count value currently stored in the second memory and stores to the transmission data frame, as the count value, a sum of the count value currently stored in the second memory and a predetermined value, and the predetermined value is calculated from the certain interval and a frequency at which the communicator performs data frame transmission.

2. The communication device according to claim 1, wherein
the certain interval is an interval from storing of the count value currently stored in the second memory to when the count value stored in the transmission data frame becomes greater than the count value currently stored in the second memory by a certain value.

3. The communication device according to claim 1, wherein
the certain interval is an interval from storing of the count value currently stored in the second memory to when the communicator has transmitted the transmission data frame a certain number of times.

4. The communication device according to claim 1, wherein
the certain interval is a predetermined amount of time.

5. The communication device according to claim 1, wherein
the predetermined value is, instead of being a value calculated from the frequency and the certain interval, an increase in the count value stored in the transmission data frame during the certain interval.

6. The communication device according to claim 1, wherein
the predetermined value is a product of the frequency and the certain interval.

7. The communication device according to claim 1, wherein
the predetermined value is, instead of being a value calculated from the frequency and the certain interval, a value smaller than an increase in the count value stored in the transmission data frame during the certain interval.

8. The communication device according to claim 7, wherein
when the transmission data frame is not authenticated by the other communication device, a value larger than the predetermined value is added to the count value read out from the second memory.

9. The communication device according to claim 1, further comprising:
a storage interval receiver that receives an instruction related to the certain interval.

10. A communication method of a data frame performed by a communication device that transmits a data frame to another communication device, comprising:
storing in a first memory that is a volatile memory, a count value that is utilized by the other communication device to determine whether or not a data frame that the other communication device has received and a data frame that the communication device has transmitted equal each other;
reading out a count value currently stored in the first memory and generating a transmission data frame including a count value that is generated based on the count value currently stored in the first memory;
transmitting the transmission data frame to the other communication device;
updating the count value currently stored in the first memory by causing the first memory to store the count value stored in the transmission data frame when the transmitting transmits the transmission data frame;

generating the count value stored in the transmission data frame by incrementing the count value currently stored in the first memory when the transmitting transmits the transmission data frame;

causing the second memory to store the count value stored in the transmission data frame at a certain interval; and when the communication device is rebooted, reading out a count value currently stored in the second memory and storing to the transmission data frame, as the count value, a sum of the count value currently stored in the second memory and a predetermined value, wherein the predetermined value is calculated from the certain interval and a frequency at which the transmitting performs data frame transmission.

11. A communication system that transmits a data frame from a first communication device to a second communication device, wherein the first communication device comprises
- a first memory that is a volatile memory, storing a count value that is utilized by the second communication device to determine whether or not a data frame that the second communication device has received and a data frame that the first communication device has transmitted equal each other,
- a frame generator that reads out a count value currently stored in the first memory and generates a transmission data frame including a count value that is generated based on the count value currently stored in the first memory,
- a communicator that transmits the transmission data frame to the second communication device,
- a storage instructor that updates the count value currently stored in the first memory by causing the first memory to store the count value stored in the transmission data frame when the communicator transmits the transmission data frame, and
- a second memory that is a nonvolatile memory, wherein when the first communication device is rebooted, the frame generator reads out a count value currently stored in the second memory and stores to the transmission data frame, as the count value, a sum of the count value currently stored in the second memory and a predetermined value, the second communication device receives a data frame transmitted from the first communication device, and authenticates whether a data frame that the second communication device has received and a data frame that the first communication device has transmitted equal each other, and the predetermined value is calculated from the certain interval and a frequency at which the communicator performs data frame transmission.

* * * * *